United States Patent [19]

Anderson

[11] Patent Number: 4,857,035
[45] Date of Patent: Aug. 15, 1989

[54] CONTINUOUS, VARIABLE POWER BICYCLE TRANSMISSION DEVICE

[76] Inventor: Cyril F. Anderson, 1491 Ute Dr., Salt Lake City, Utah 84108

[21] Appl. No.: 222,040

[22] Filed: Jul. 21, 1988

[51] Int. Cl.$^4$ ............................................. F16H 9/00
[52] U.S. Cl. .................................. 474/69; 280/259; 474/80
[58] Field of Search ............................ 474/69, 78–81; 74/594.1–594.4; 280/253–259, 261

[56] References Cited

U.S. PATENT DOCUMENTS

| | | | |
|---|---|---|---|
| 3,779,099 | 12/1973 | Trammell, Jr. | 74/594.4 |
| 3,906,807 | 9/1975 | Tammell, Jr. | 280/256 X |
| 4,019,230 | 4/1977 | Pollard | 280/259 X |
| 4,159,652 | 7/1979 | Trammell, Jr. | 280/259 X |
| 4,429,890 | 2/1984 | Hon | 280/259 |
| 4,469,478 | 9/1984 | Weiss | 474/80 |
| 4,599,079 | 7/1986 | Chappell | 474/80 |

OTHER PUBLICATIONS

"Wheels and Wheeling" The Smithsonian Cycle Collection, Smith Hempstone Oliver and Donald H. Berkebile, Smithsonian Institution Press, City of Washington, 1974–No. 24.

Primary Examiner—Thuy M. Bui
Attorney, Agent, or Firm—Thorpe, North & Western

[57] ABSTRACT

A continuous, variable power transmission device for use with a crank driven power train wherein crank lever arm movement passes through a prescribed arc of less than 180 degrees in reciprocating sequence applicable to a rotary drive wheel. The device includes a frame, a support arm movably attached to the frame in a manner such that the suport arm may be variably displaced in forward and rearward directions. A rotary drive wheel is attached to the support arm such that the wheel axis is displaced in concert with the support arm movement. At least one crank lever arm is rotationally coupled to the frame, with the remaining end being free to receiprocate through a portion of the defined prescribed arc. A guide track is disposed along the length of the crank lever arm and a tracking member is coupled within the guide track for displacement in reciprocating movement. Coupling structure is attached to enable applied force at the crank lever arm to pass through the tracking guide to the rotary wheel. A biasing member is coupled to the support arm for urging the support arm toward a forward position which causes the tracking member to pass through a larger perimeter segment of arc movement than would occur without such a biasing member. This device operates to variably increase the moment arm with respect to the rotary wheel in response to increasing force applied at the crank lever arm.

24 Claims, 4 Drawing Sheets

CONTINUOUS, VARIABLE POWER BICYCLE TRANSMISSION DEVICE

BACKGROUND OF THE INVENTION

1. Field of Invention

This invention relates to variable power transmission devices for use with a crank-driven power train in which the crank lever passes through a prescribed arc of less than 180 degrees. More specifically, the present invention relates to a power transmission device useful as an automatic bicycle transmission.

2. Prior Art

The search for an efficient power transmission system for a bicycle has been both long and active. Ever since pedalled vehicles such as bicycles and tricycles were conceived, a strong interest toward finding improved power train systems has existed. Virtually all power train systems for pedalled vehicles include some form of primary drive wheel or sprocket coupled by a chain or pulley which rotates the axle of the rear wheel of the vehicle.

The most common transmission system for bicycles includes a rotary drive sprocket with attached pedals in opposing orientation. The pedals of the drive sprocket are rotated, which rotational energy is transferred by a chain or belt to a second drive sprocket of lesser dimension on th rear bicycle wheel. Multiple gearing systems have long existed for such bicycles. For example, U.S. Pat. No. 4,599,079 discloses the typical gearing construction for a ten or fifteen speed bicycle which utilizes a derailer to shift the chain to an appropriate sprocket for realizing a lower or higher gear ratio. The subject patent also discloses the use of an automatic shifter for the derailer, thereby freeing the bicyclist from shifting levers to shift gears. This system includes the use of a stabilizing hydraulic cylinder which is designed to inhibit clockwise rotation of the movable shifter arm during certain phases of operation This cylinder operates as a form of dampening means to control unwanted shifting between gears.

U.S. Pat. Nos. 3,779,099 and 3,906,807 by Trammell, Jr., disclose two additional approaches for improving power transfer in a bicycle transmission system. The second Trammell patent discloses a rotary drive system which automatically shifts pedal force between the crank arm and an advance-crank arm. The earlier Trammell patent suggests improvements to a vertically reciprocating pedal drive system. Although these respective patents provide improvement in applied moment arm to the drive sprocket, neither gives the broad range of shifting power as is provided by the multiple sprocket, derailer system as illustrated by Chappel in U.S. Pat. No. 4,599,079.

The vertically reciprocating pedal arrangement of the -099 patent of Trammell has likewise been within the prior art for many years. For example, in 1888, H. B. Smith Machine Company developed a tricycle which utilized the reciprocating vertical pedal motion to independently drive separate rear wheels. This tricycle is still on display in the Smithsonian Institute. Power transfer from the vertical pedal arrangement is generally accomplished through a roller clutch assembly, such as is disclosed in U.S. Pat. No. 4,019,230 by Pollard. This mechanical system allows the bicyclist to use downward pressure on the pedal as the power stroke, with the pedal being raised to its upright position by the power stroke of the other pedal. The use of such one-way bearings provides an efficient system for alternating power strokes between the feet of the bicyclist in an up and down motion, rather than the more traditional rotary motion normally associated with bicycles. Additional automatic transmission devices of interest are set forth in U.S. Pat. No. 4,127,038 which utilizes a front sprocket system, and U.S. Pat. No. 4,741,546 which utilizes multiple belt-driven expanding pulleys.

Despite the many years of innovation and change within the bicycle transmission art, none of the variety of improved transmission devices appears to have achieved any form of commercial success or public acceptance. In many instances, such devices and transmission systems are complex and expensive, and suffer from uncertain reliability. Accordingly, the majority of cyclists continue to manually shift between multiple sprockets to achieve various gear ratios ranging from low to high. Consequently, such cyclists continue to experience the frustration of manipulating a combination of levers to properly derail the drive chain between desired sprockets and to experience mechanical difficulties as chains and sprockets fail to mesh or otherwise malfunction.

What is needed, therefore, is a simple automatic transmission system which does not require multiple sprockets associated with a derailing system, and which automatically respond to the cyclist's changing needs of power versus speed, based on the changing topography of the land.

OBJECTS AND SUMMARY OF THE INVENTION

It is an object of the present invention to provide a continuous, variable power transmission device which can be used as part of a bicycle transmission and which allows the cyclist to experience a continuous range of gear ratios responsive to the force applied during pedal action.

It is a further object of the present invention to provide a fully automatic transmission system for a bicycle which requires no use of hands and which needs no variation in method of pedalling.

A still further object of this invention is to provide such an automatic transmission device which can be downshifted while at a standstill.

Another object of this invention is to provide a transmission system which automatically shifts into lower gear ratios in response to increased foot pressure at the pedal as typically occurs as the cyclist begins ascent of a hill or other incline.

Yet another object of this invention is to provide an automatic transmission system for a bicycle which exceeds a conventional fifteen-, eighteen- or even twenty-four-speed bicycle gear range, and also has the advantage of being infinitely variable over this range.

An additional object of this invention is to provide an automatic transmission system which can be shifted into overdrive, increasing all gear ratios from a normal-drive transmission configuration.

Another object of the present invention is to provide such an automatic transmission system which requires only a single sprocket mounted at the rear wheel without the need of any derailing system.

These and other objects are realized in a continuous, variable power transmission device which may be used with any crank driven power train wherein the crank lever arm movement passes through a prescribed arc of less than 180 degrees in a reciprocating sequence typically associated with a rotary drive wheel. Power from the drive wheel is transferred to a load by means of a chain or drive belt which is normally maintained in continuous tension during use. Specifically, the subject device includes a frame, such as a bicycle frame, for supporting moving parts of the transmission system. A support arm is movably attached to the frame in a manner such that the support arm may be variably displaced in forward and rearward directions with respect to the frame. The rotary drive wheel is attached to the support arm so that the wheel axis is displaced in concert with the forward and rearward directional movement of the support arm. The crank lever arm such as the bicycle pedal is coupled at one end to the frame, with the remaining end being free to be reciprocated by a foot or other method of applying force. This crank lever arm moves along a crank path which is adjacent to a perimeter segment of the rotary drive wheel to faciliate power transfer from the crank to a pair of one-way bearings which transfer power into the rotary drive wheel. Each crank arm includes a guide track disposed along its length with a tracking means such as a cam follower coupled within the guide track. This cam follower is adapted to displace in reciprocating movement along the guide track in varying degrees to change gear ratios in response to foot pedal pressure. Means is provided for transferring the applied force from the crank lever arm to the rotary wheel for movement in one rotational direction. A connector means couples the tracking means or cam follower to the force transfer means such as the one-way clutch bearing system, thereby defining the path of force which converts the vertical motion of the pedals to rotary motion within the drive wheel. A compression spring or other form of biasing means is coupled to the support arm for urging the support arm toward a forward position, counter to the rearward displacement positions which are urged by force of the pedal action with respect to the drive wheel. This biasing means tends to drive the cam follower to a more distal position along the crank lever arm, causing the cam follower to pass through a larger perimeter segment than would normally occur without the biasing means displacement. In consequence, a lesser moment arm is applied, providing a lower gear for more output torque. These respective elements cooperate together to cause relative displacement of the cam follower along the guide track to variably increase the moment arm with respect to the rotary wheel in response to increasing force applied at the crank lever arm. This action thereby converts the transmission device to a lower gear as the force applied at the crank lever arm increases. Conversely, the loss of pedal pressure permits return of the tracking member to its neutral position in response to the biasing means, reducing the moment arm and raising the transmission to a higher gear.

The subject disclosure also identifies use of a dampening means which is coupled between the support arm and frame and operates to resist sudden displacement of the cam follower upon release of foot pressure. In other words, the dampening means restrains the support arm in a stable position so that the cyclist can momentarily release foot pressure without causing sudden shifting of the automatic transmission device. An overdrive device is also disclosed for use with level or downhill applications.

Other improvements, objects and features of the present invention will be apparent to those skilled in the art, based upon the following detailed description, taken in combination with the accompanying drawings.

DETAILED DESCRIPTION OF THE INVENTION

Figure 1:
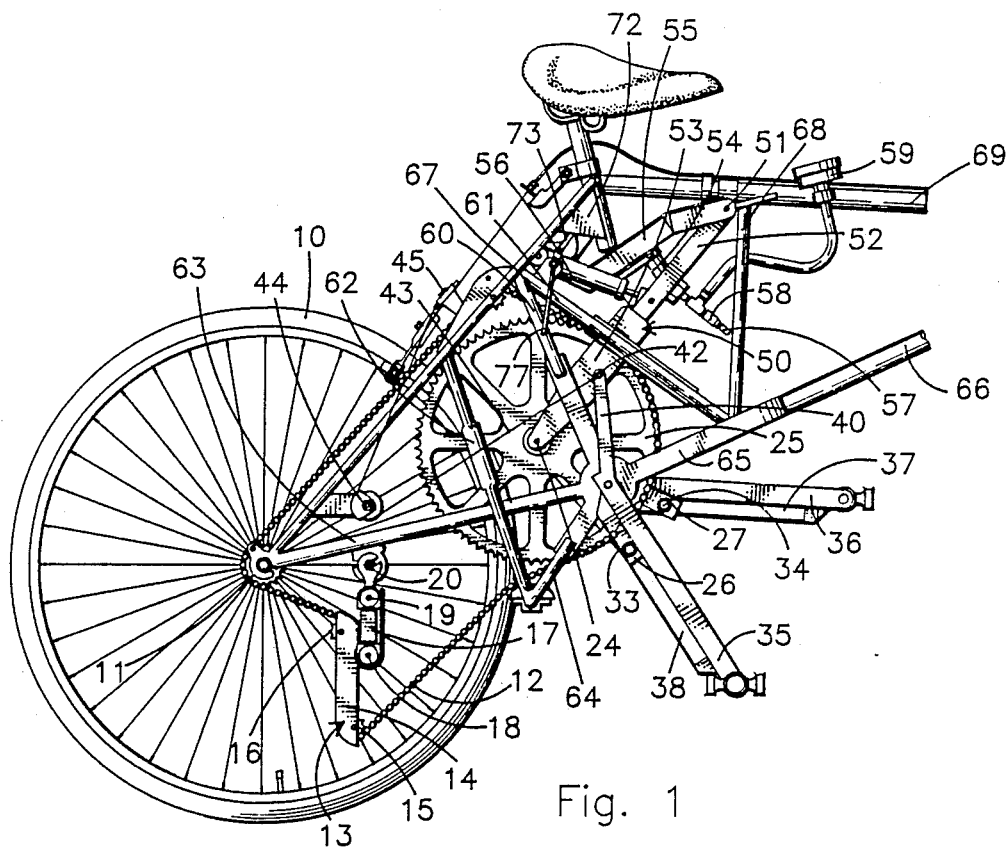
FIG. 1 shows a side, plan view of a bicycle embodiment of the present invention.
Figure 2:
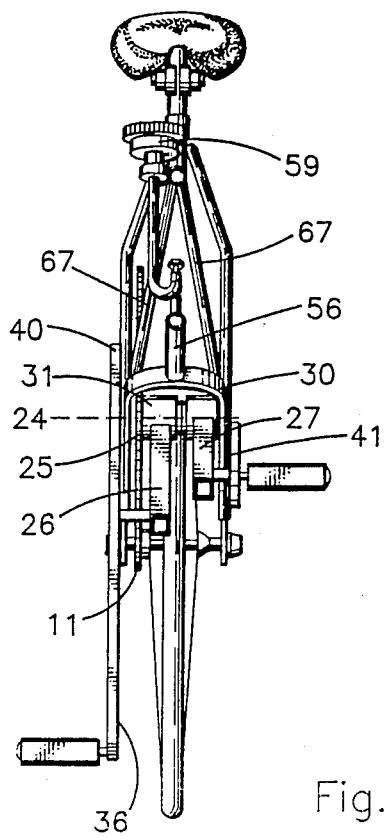
FIG. 2 shows a frontal view, taken from the right side of FIG. 1.

Referring now to the drawings:

FIGS. 1 and 2 disclose a rearward section of the bicycle adapted with an automatic transmission device representing one embodiment of the present invention. Specifically, this device provides a continuous, variable transmission of power in response to pedalling action by the cyclist. Although this invention may be applied to any crank-driven power train wherein crank lever arm movement passes through a prescribed arc of less than 180 degrees in a reciprocating sequence such as typically applied to a rotary drive wheel, it is particularly suitable for applications to wheeled vehicles such as bicycles.

It is common knowledge that the object of a power transmission device is to supply torque to the rear wheel 10 by means of a small sprocket 11 which is coupled to the axle of the wheel. In the illustrated embodiment, the rear wheel 10 is a standard 27-inch rear wheel with a wheel sprocket 11 which has twelve teeth for meshing with the drive chain 12. It is desirable for the wheel sprocket 11 to have as few teeth as possible in order to provide the largest possible range of gear ratios.

Because the present device provides a differing range of gear ratios, a chain take-up assembly 13 is provided to maintain the chain in tension, despite the occurrence of slack arising from automatic displacement developed within the transmission device. An advantage of the present invention is that the chain take-up assembly 13 has very few working parts because it does not need to derail or shift the chain from side to side. Its only function is to maintain the chain in tension.

This is accomplished by a take-up extension arm 14 which includes a sprocket 15 and 16 on each end. At least one of these sprockets is spring loaded to shorten the distance of the chain in that area when it is lengthened by going into low gear. Typically, sprocket 16 will provide the major spring biasing structure which would rotate the chain toward its maximum perimeter, thereby maintaining the chain in tension despite the creation of slack by the transmission device. The extension arm 14 is coupled to the bicycle frame 63 by means of a tension arm 17. Item 18 coupled with respect to the extension arm and tension arm houses the rotational spring associated with sprocket 16. The tension arm 17 is coupled to the frame 63 by means of a second spring-powered axis 19 which is coupled to frame 63 by bolt attachment 20. This derailer assembly is of conventional design and is not intended to be limiting with respect to use in the present invention. Indeed, any mechanism useful for taking up slack within the drive chain may be applied within the inventive concept disclosed herein.

Power for the wheel sprocket 11 is supplied through the drive chain 12 from a main drive sprocket 25. The present invention contemplates use of a larger drive sprocket than is typically associated with bicycle structures. As is noted from the drawings, this sprocket is constructed with spokes and open gaps therebetween to reduce its weight and has a diameter of approximately 12 inches or 30½ centimeters. This larger drive sprocket approximately corresponds to a range of gears similar to that provided by a conventional fifteen-, eighteen- or twenty-four-speed bicycle utilizing a derailer assembly. It will be apparent to those skilled in the art that this equivalency depends not only on the diameters of the respective sprockets, but also upon the distance traveled between each pedal cycle between left and right foot. Here again, the specific sizes are not meant to be limiting.

This sprocket 25 includes an axial mount 24, upon which are journalled two one-way, roller clutch bearings 30 and 31. These are conventional one-way bearings which provide rotational transfer to the drive sprocket 25 during downward stroke of the attached pedals through extension arms 26 and 27. The clutch is disengaged during the up stroke to prevent reverse movement of the sprocket.

These extension arms 26 and 27 from the clutch bearing assemblies 30 and 31 are coupled to crank lever arms 35 and 36 with attached pedal members at distal ends thereof. The method of attachment of the respective extension arms is by way of cam followers 33 and 34 which are disposed within linear tracks 37 and 38 contiguous with the crank lever arms 35 and 36. Any movement of the cam followers within these respective tracks constitutes a change in gear ratios as will be more apparent hereafter.

Figure 4:
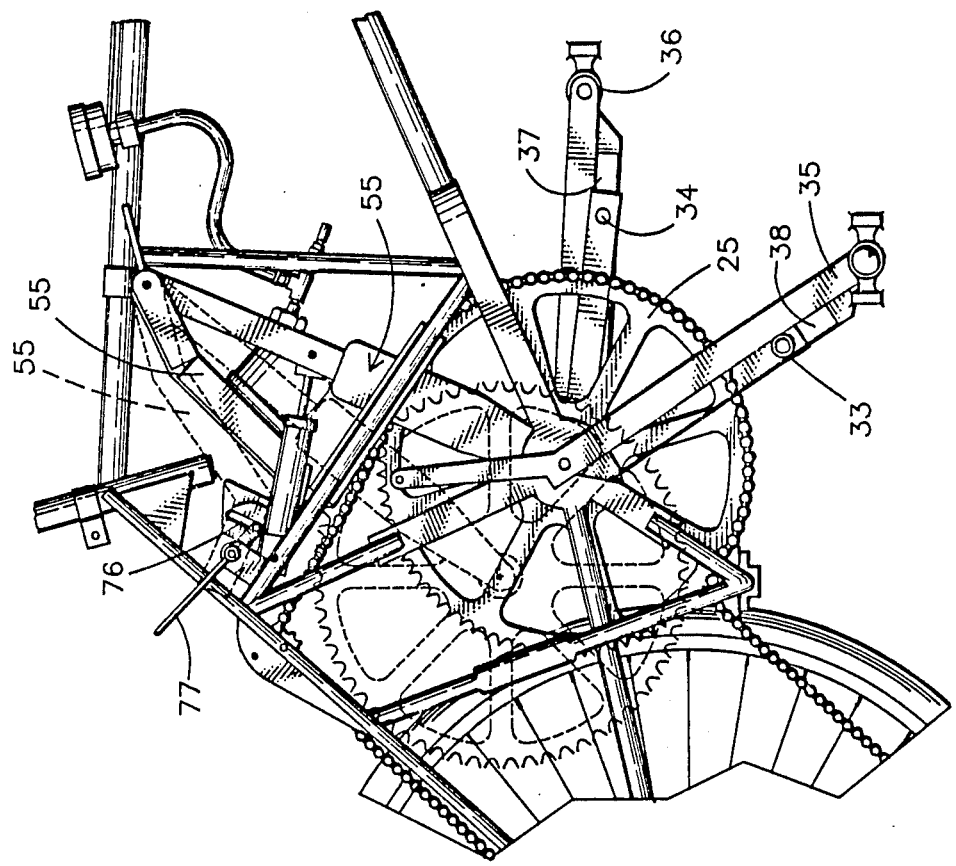
FIG. 4 shows the same isolated view of FIG. 3 wherein the transmission device has been shifted into an overdrive configuration, the broken lines representing a lower gear configuration illustrated in FIG. 3.

From a conceptual point of view, therefore, the present invention involves transfer of forces into the clutch bearing assemblies 30 and 31 by means of extension arms 26 and 27 which constitute connector means coupling the cam followers 33 and 34 (also referred to as tracking means) to the clutch bearing assemblies 30 and 31 (also referred to as "force transfer means"). This enables any force applied at the crank lever arms 35 and 36 to pass through the cam followers 33 and 34 and coupled extension arm 26 and 27, through the clutch bearing assembly and into the drive sprocket 25. The actual amount of force applied depends on the effective length of the lever arm extending to the clutch bearing assembly. This lever arm length is automatically adjusted as cam followers 33 and 34 are displaced within the guide track 37 and 38. For example, the embodiment shown in FIG. 1 is in a low gear range and has an effective lever length extending from the axis at 24 to distal pedals located at the ends of lever arms 35 and 36. As the cam followers 33 and 34 are displaced along the guide tracks 37 and 38, axis 24 follows, thereby reducing the spacial distance between the distal pedals and the sprocket axis 24. This also affects a lower degree of sprocket rotation with each downward power stroke of the lever arms 35 and 36, and consequently results in a lower gear range. Accordingly, this configuration changes in operation such as is illustrated in FIG. 4 in which the position corresponds to a higher gear, where the cyclist is getting maximum rotation of the drive sprocket 25 with each pedal stroke. As mentioned before, these pedal strokes in the present embodiment are referred to as a form of vertical movement; however, it to be understood that technically this movement constitutes a partial arc wherein each pedal is raised above a horizontal position, approximately 30 degrees and finishes at a substantially vertical orientation at about −90 degrees from horizontal.

The pedals are alternatively raised to the start position by means of a pulley system linking repositioning levers 40 and 41 which form extensions from the crank lever arms 35 and 36. The system is operated by means of a pulley wire 43 attached at one end to the distal end 42 of the repositioning arm 40. This wire rotates through a pulley 44 which redirects the wire toward a centered pulley 45. This wire then follows a similar course of pulley orientation to a terminal connection at the end of repositioning arm 41. It will therefore be apparent that when one presses the raised pedal on crank lever arm 36, the repositioning wire is pulled forward, pulling repositioning arm 40 to a rearward position to raise the attached pedal to crank lever arm 35. Accordingly, vertical repositioning of each pedal occurs even against some resistance by the cyclist. Here again, it is apparent that other forms of repositioning mechanisms may be adapted to accomplish the purposes set forth. It is to be understood, therefore, that this disclosed form of repositioning system is not meant to be limiting with respect to the present invention.

Returning to the automatic transmission function of the present invention, attention is directed to item 50 which comprises a support arm. This member functions to support the drive sprocket 25 and to enable its displacement in a forward or rearward direction, causing displacement of the cam followers 33 and 34 along guide tracks 37 and 38. A preferred embodiment of this support arm consists of a forked yoke having a single mounting stem 52 and a pair of forked elements 53. This yoke 50 is mounted at an upper end of the yoke stem 52 at a rotational axis 51 coupled to the frame 69. The drive sprocket 25 is rotationally attached between distal ends of the forked yoke members 53 such that the sprocket can freely rotate in the vertical plane of the bicycle. This means of attachment typically comprises an axle which is rigidly fixed to the drive sprocket and journaled at point 24 on the forked yoke members 53. In this configuration, the support arm is displaced in concert with the forward and rearward movement of the drive sprocket 25 and vice versa.

Because the drive sprocket is coupled to the crank lever arms 35 and 36 by the roller-clutch bearings, depression of either pedal downward drives the sprocket wheel in a clockwise direction. In other words, the roller clutch bearings and the attached lever arm linkage extending to the pedals provides means for rotationally coupling each crank lever arm indirectly to the drive sprocket via cam followers 33 and 34, while proximal ends of the crank lever arms are attached to a portion of the frame 65. This rotationally fixed attachment to the frame 65 maintains the crank lever arms and attached pedals 35 and 36 in a fixed, reciprocating arc path so that the cyclist is always pedalling in the same position and movement pattern. This arc path is adjacent to a perimeter segment of the rotating drive wheel 25.

In general concept, when the pedal is depressed, the crank lever arm rotates the drive sprocket 25 in clockwise orientation, pulling the drive chain 12 along its sprocketed path. This movement and chain tension has a tendency to pull the attached yoke and drive sprocket rearward along the direction of tangential forces applied by the chain. If no other forces were applied in a counter direction, the yoke would quickly rotate to its most rearward position, limited by the rearward abutting surface of the guide track 37 or 38. In this position, the bicycle is operating in low gear, with maximum power per foot stroke.

Because of this rearward response of the support arm 50, a counter spring or biasing means 54 is braced between the support arm 50 (at a point of attachment on upper stem 52) and a rearward support plate 55 which is rotatably fixed in position at its axis with respect to the bicycle frame. This spring 54 applies forward forces to bias the position of the cam followers 33 and 34 toward an intermediate section of the guide tracks 37 and 38. The strength of the spring determines this positioning and also the amount of pedal force required to displace the drive sprocket and support arm to a lower gear position.

In the preferred embodiment, the biasing means 54 comprises an air spring which includes an inlet valve 58 and port 57 for introducing pressurized air for adjusting spring strength to the weight and preference of the cyclist. For example, heavier cyclists will normally require greater air pressure and spring force than will lighter cyclists. Air gauge 59 is provided so that specific pressure amounts within the air spring may be readily determined.

In operation, therefore, the drive sprocket 25 and support arm 50 are disposed in an intermediate position from the forward and rearward limiting positions defined by guide tracks 37 and 38. This intermediate position is stabilized by force exerted through the air spring 54. As downward pedal pressure is applied, the air spring begins to retract, allowing the drive sprocket to rotate to a lower gear position in a rearward displacement of cam followers 33 and 34. Accordingly, the present invention enables automatic shifting into lower gears by virtue of a balanced resistance of the air spring pressure 54 versus pedal pressure applied by the cyclist. As was noted, the degree of resistance and response is controlled by the amount of air pressure placed within the air spring. At any given setting of air pressure, the greater the amount of force applied at the pedal, the greater the displacement of the cam followers 33 and 34 to lower gear positions. Therefore, going up a steep incline with maximum foot pedal pressure will displace the cam follower to the lowest available gear (assuming proper air pressure within the air spring 54).

In order to prevent the support arm 50 and drive sprocket 25 from forward displacement during momentary decreases in foot pressure at the end of each pedal stroke, dampening means 56 is provided for stabilizing the support arm 50 at any particular position for a preset duration of time. In other words, when the drive sprocket and cam followers are operating at low gear ratios, a momentary release of pedal force does not result in the support arm 50 immediately rotating to a forward position, despite the force applied by the air spring 54. Instead, the dampening means 56, which is coupled directly to the support arm, restrains the drive sprocket against movement for a short duration of time sufficient to enable the cyclist to again restore full pedal pressure.

In the disclosed embodiment, the dampening means consists of a cylinder and rod assembly 56. When the rod is extended to its full length and the cylinder chamber is at maximum volume, the yoke is then in its limiting position, despite the fact that additional track guide may be available toward the pedal ends of the lever arms 35 and 36. Accordingly, the length of the rod within the cylinder is critical for adjusting the distance which can be transcended by cam followers 33 and 34. The low gear limiting factor may be either the cam follower abutting against the left side of the guide track, or the abutment of the rod against the distal side of the cylinder which is attached to the frame of the bicycle 67. This biasing means 56 operates by virtue of fluid hydraulics, wherein the captured fluid within the cylinder displaces from one side of an interior piston through bleeder openings through the opposite side. The size of bleeder openings is small and controlled so that fluid transfer occurs at a very slow rate.

Accordingly, as the cyclist applies increasing pressure to the pedals, the air spring forces are overcome, and concurrently hydraulic fluid is pushed from the left chamber to an increasing right chamber of the cylinder. Such fluid displacement occurs at a gradual rate consistent with a gradual increase in low gear ratio. At some point, the cyclist foot pressure will stabilize, as will the relative displacement of hydraulic fluid within the dampening cylinder 56.

At each given pressure drop of the pedal cycle (as the pedal is at $-90$ degrees), the air spring attempts to force the drive sprocket forward but is restrained by limited movement of hydraulic fluid between the chambers. This creates a short time delay which enables the cyclist to again re-establish foot pressure and maintain the low gear ratio. The period of time delay may be adjusted by sizing of the bleeder holes or viscosity of the hydraulic fluid. It will be apparent to those skilled in the art that other forms of dampening means may be available to accomplish this aspect of the invention. The important criteria is that the dampening means develops a form of resistance, such as the head of pressure developed by the movement of the piston within the cylinder in compression, wherein the resistance is balanced to overcome the displacement force of the biasing means at some stable, intermediate position. From a conceptual viewpoint, a correct interplay of these elements is realized when the urging forces of the biasing means 54 are selected in relation to dampening forces from item 56 to provide a balance wherein shifting into lower gear is enabled when applied forces to the crank lever arm 35 and 36 and connector means 26 and 27 overcome these biasing forces, and providing that the dampening means is free to displace to increase relative length of the applied lever arm. In summary, the biasing means 54 operates to urge the drive sprocket and cam followers 33 and 34 to an intermediate, high gear position; the rotating support arm 50 enables rearward displacement of the drive sprocket and cam followers to develop lower gear ratios; and the dampening means 56 prevents sudden return of the drive sprocket and cam followers to the higher gear position for short time periods which correspond to loss of pedal pressure between each cycle of pedal movement.

An example of use may assist in perceiving the relationships involved. Specifically, a cyclist first adjusts the air pressure within the biasing means 54 by pumping air through inlet 57. Such pressure may range from 20 psi for a small person to 40 psi for a person of 200 pounds or more. Again, this is the amount of pressure needed to maintain the support arm 50 in the forward neutral or high gear position. This would be the limiting position set by the distance the rod permits the support arm to move in the forward guide track 37. For an average person of 150 pounds, the preset pressure may be 30–35 pounds of pressure. When the spring is fully loaded, the piston of the dampening means 56 is fully extended and the cam followers 33 and 34 are in a forward limiting position within guide tracks 37 and 38.

The person then mounts the bicycle and begins to depress the pedals. The drive chain 12 urges the drive sprocket 25 and attached support arm 50 in a clockwise direction or rearward toward the back wheel. This results in compression of the air spring 54 and commencement of displacement of the rod into the cylinder of the dampening means 56. Hydraulic fluid concurrently displaces from the left chamber of the cylinder to a right chamber. As the cyclist completes a pedal stroke, pedal pressure drops suddenly and biasing forces from the air spring 54 attempt to urge the support arm 50 back toward its neutral position. Because of slow fluid transfer, however, within the cylinder 56, rapid return of the support arm is precluded. As pedal pressure is restored on continuing downward strokes, the cam followers 33 and 34 continue to displace rearward into lower gear position (high gear ratios).

As the cyclist gains speed, less force is needed in the low gear positions, and the air spring 54 begins to overcome pedal pressure and return the cam followers 33 and 34 toward the neutral position. Dampening means 56 permits this gradual return as the hydraulic fluid slowly displaces from the right cylinder to the left side. As the cyclist proceeds down an incline, even less pressure is required at the pedals, and the air spring 54 operates to displace cam followers 33 and 34 to the full limiting, high gear position along the intermediate section of guide track 37 and 38. In this scenario, the dampening means is designed to take approximately 30 seconds to go from low gear to high gear. Accordingly, this is ample time for it to not move sufficiently far between each pedal stroke so that motion is wasted by the cyclist.

It will be apparent at this point that other locking mechanisms may be used in place of the dampening means 56. Indeed, any mechanical means for restraining rapid displacement of the support arm between pedal strokes could be applied to accomplish the desired objective.

Figure 3:
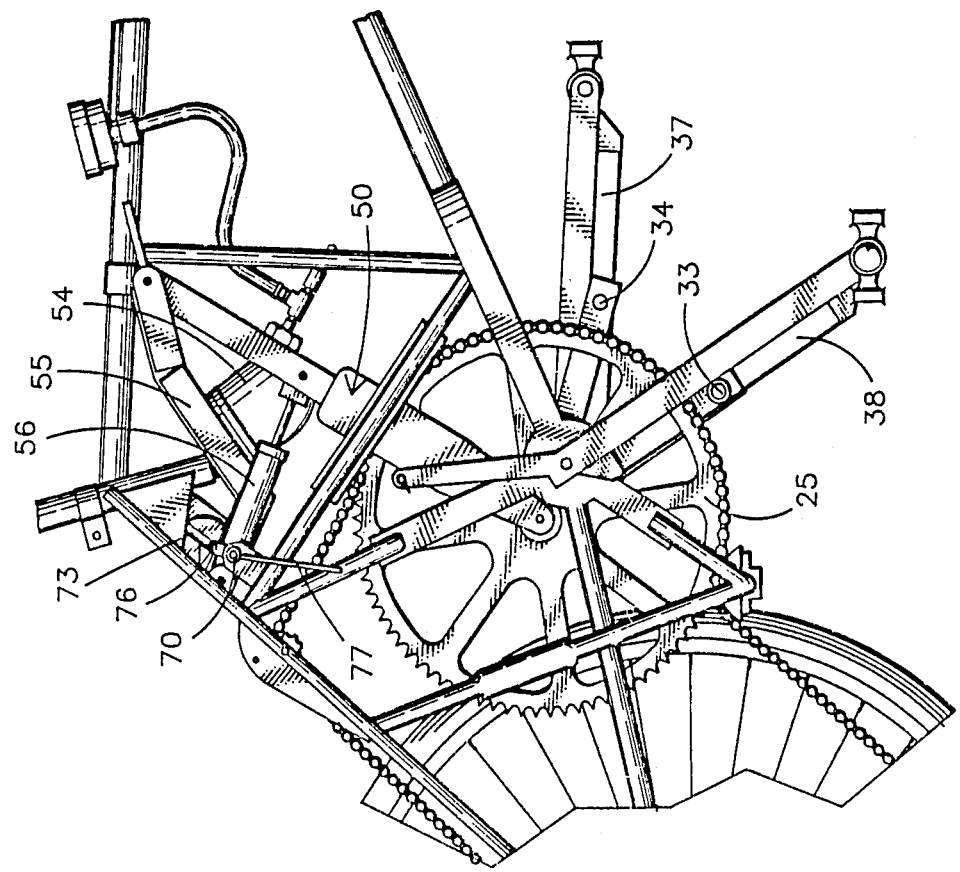
FIG. 3 shows an isolated view of the transmission device, adjusted to its normal gear range position.
Figure 5:
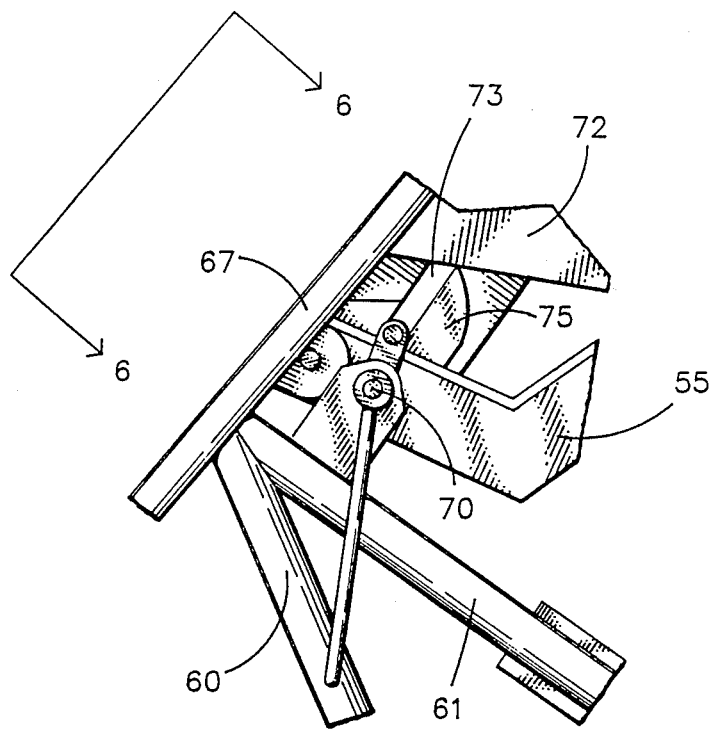
FIG. 5 shows an isolated view of the overdrive displacement mechanism.
Figure 6:
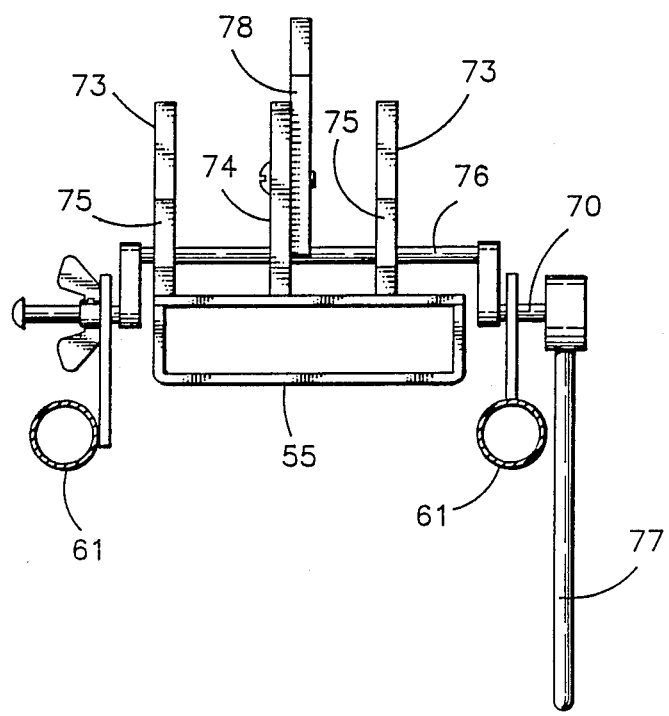
FIG. 6 a cross-section taken along the lines 6—6 of FIG. 5.

Returning to the previous scenario, referring to the cyclist maneuvering down an incline, the preferred embodiment discloses use of an overdrive mechanism which permits utilization of a series of higher gear positions. Generally speaking, this overdrive system which includes overdrive displacement means such as is illustrated in FIGS. 5 and 6 which operate to displace the support arm from its normal neutral position representing normal transmission ratios, to a second, forward position representing an overdrive, or higher gear position. These respective positions are indicated in FIGS. 3 and 4 respectively.

In simple terms, the overdrive displacement means as shown in these figures comprises a lever 77 which is coupled to a axial rod 70, which is further coupled to an offset rod 76. This offset rod tracks along slotted track guides 73. FIGS. 3 and 5 show one end of the track guide with the offset rod seated therein, representing the normal gear range. In this configuration lever 77 is in the down position. FIG. 4 shows the same lever 77 rotated into a second position which offsets support plate 55, thereby translating the entire sprocket assembly forward. As the offset shaft 76 is rotated into the new position, the support arm 50 is forced into a more forward position which slides the cams 33 farther forward. This reduces the mechanical advantage and results in a greater rotation of the sprocket per stroke of the pedal.

The limiting position of the offset rod representing overdrive as shown in FIG. 4 is provided by a blocking element 78 which caps the slot 73 in the central cam member 74. Slots 73 in cams 75 are open ended and would otherwise allow the offset rod 76 to slide free from the slotted track guide. Obviously, many structural adaptations may be adopted to implement the overdrive modification. Furthermore, it should be noted that the full range of gear ratios available over both the normal and overdrive positions could be embodied in a single range if the range of movement of the support arm 50 and dampening means allowed the cam 33 to track the full length of the lever arm track 38.

Figure 7:
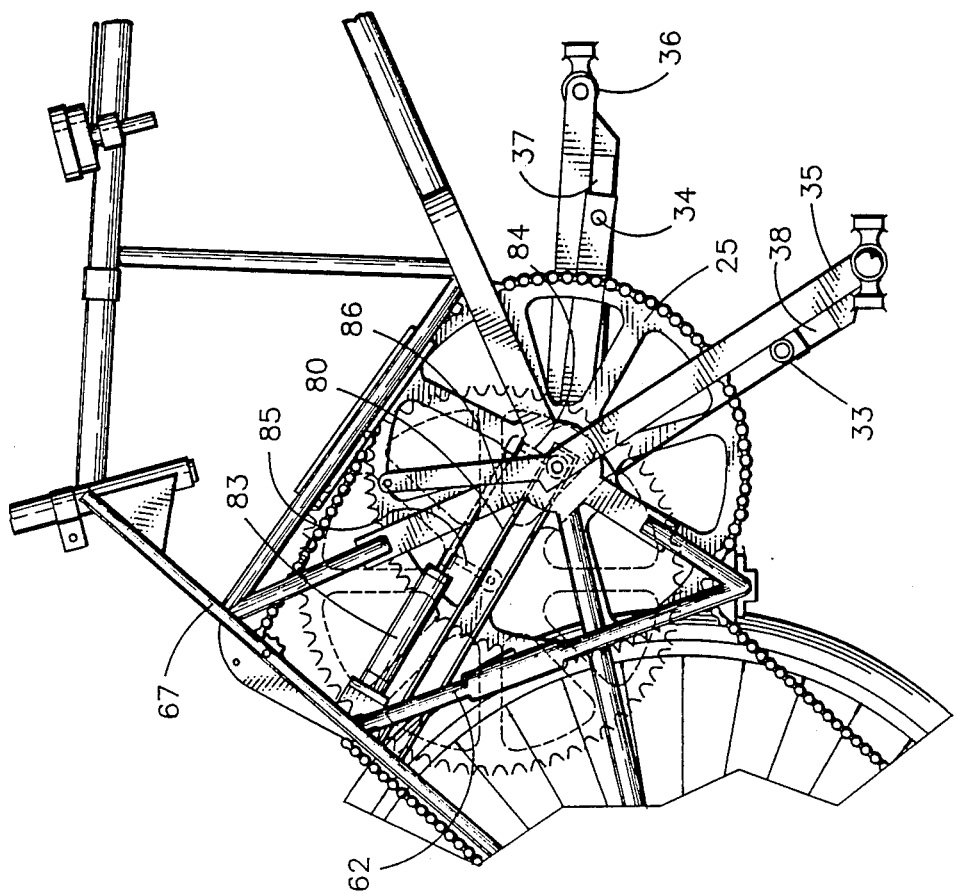
FIG. 7 shows an alternate embodiment wherein the rotary support arm illustrated in prior figures has been substituted by a support arm utilizing linear displacement.

It is to be understood that the variety of specific examples set forth in the preferred embodiment are for illustration of the general principles of invention conceived and claimed as follows by the inventor, and are not to be deemed as limiting the scope of invention. For example, FIG. 7 illustrates alternate support arm structure to the rotary arm 50. This alternate structure provides linear displacement of the drive sprocket 25 along a track 80. Movement of the sprocket 25 along this linear path is regulated by tracking members such as cam followers 81 and 82 which traverse the track in response to force applied to the lever arms 35 and 36. The track 80 is fixedly attached to the frame 62 or 67. The dampening means 83 operates to limit abrupt motion as was previously described, and is coupled to the cam followers 81 and 82 by support members 84 and 85, coupled to the movable piston rod 86. Accordingly, the sprocket 25 responds with linear motion parallel with the guide track 80 and dampened by the dampening means 83.

I claim:

1. A continuous, variable power transmission device for use with a crank driven power train wherein crank lever arm movement passes through a prescribed arc of less than 180 degrees in a reciprocating sequence applicable to a rotary drive wheel which is coupled by chain or drive belt in continuous tension to a load, said device comprising:
   (a) a frame for supporting moving parts of the transmission device and including a fixed reference point; (b) a support arm movably attached to the frame in a manner such that the support arm may be variably displaced in forward and rearward directions with respect to the frame reference point;
   (c) means for attaching the rotary drive wheel to the support arm such that the wheel axis is displaced in concert with support arm movement in the forward and rearward directions;
   (d) means for rotationally coupling one end of a crank lever arm to the frame, with the remaining end being free to be reciprocated through a portion of the defined arm along a crank path which is adjacent a perimeter segment of the rotary drive wheel;
(e) a guide track disposed along a length of the crank lever arm;
(f) tracking means coupled within the guide track and adapted for displacement in reciprocating movement along the guide track;
(g) force transfer means for transferring an applied force from the crank lever arm to the rotary wheel for movement in one rotational direction;
(h) connector means coupling the tracking means to the force transfer means to enable the force applied at the crank lever arm to pass through the connector means and tracking guide to the transfer means and rotary wheel; and
(i) biasing means coupled to the support arm for urging the support arm toward a forward position (counter to the rearward displacement urged by force applied to the crank) with respect to the frame reference point which causes the tracking member to pass through a larger perimeter segment than would occur without the biasing means, thereby creating a lesser moment arm with respect to the rotary drive wheel;
said device being operated to cooperatively cause relative displacement of the tracking member along the guide track to variably increase the moment arm with respect to the rotary wheel in response to increasing force applied at the crank lever arm to thereby convert the transmission device to a lower gear as the force applied at the crank lever arm increases, said device permitting return of the tracking member responsive to the biasing means to a lesser moment arm as crank lever arm force decreases.

2. A continuous transmission device as defined in claim 1, further comprising dampening means coupled between the support arm and frame and operable to gradually displace and resist against sudden displacement forces generated by the biasing means, said dampening means including time delay means having a resistive force imposed against the biasing means, which force is maintained in substantial strength for some preset period of time of sufficient duration to maintain a stable position for the support arm with respect to the frame for at least one complete cycle of movement of the rotary drive wheel.

3. A continuous transmission device as defined in claim 2, wherein the dampening means comprises a cylinder and piston capable of developing a head of pressure within the cylinder by reason of movement of the piston in compression, said head of pressure operating to resist the displacement forces of the biasing means;
said time delay means comprising means for reducing the head of pressure in a controlled manner to permit gradual release of cylinder pressure over the preset period of time.

4. A continuous transmission device as defined in claim 3, wherein the time delay means comprises small bleeder holes positioned with respect to the piston to provide a gradual release or pressure from within the cylinder.

5. A continuous transmission device as defined in claim 2, wherein urging forces of the biasing means are selected in relation to dampening forces to provide a balance wherein shifting into lower gear is enabled when applied forces to the crank lever arm and connector means overcome the biasing forces and the dampening means is free to displace to increase relative length of the applied lever arm.

6. A continuous transmission device as defined in claim 2, further comprising an overdrive shifting mechanism which includes overdrive displacement means coupled to the dampening means, support arm and attached drive wheel for displacing the support arm from a first neutral position representing normal transmission ratios at high gear to a second, forward position representing an overdrive, higher gear transmission.

7. A continuous transmission device as defined in claim 6, wherein the overdrive displacement means is coupled to the frame and provides the point of attachment of the dampening means to said frame, the remaining end of the dampening means being coupled to the support arm, said overdrive displacement means comprising a lever with at least two positions representing normal transmission range and high gear transmission range respectively.

8. A continuous transmission device as defined in claim 1, wherein the frame comprises a human-powered vehicle powered by the rotary drive wheel.

9. A continuous transmission device as defined in claim 8, wherein the vehicle comprises a bicycle.

10. A continuous transmission device as defined in claim 1, wherein an axis of the rotary drive wheel is coupled to the support arm at a location whose locus of points during reciprocal movement of the support arm forms a path which approximately intersects a fixed rotational axis of the crank lever arm at the frame.

11. A continuous transmission device as defined in claim 1, wherein the variable displacement of the support arm occurs in a rotational manner about a rotational axis located at the point of attachment of the support arm to the frame.

12. A continuous transmission device as defined in claim 11, wherein the rotary drive wheel is attached at its rotational axis to a movable end of the support arm, the remaining end of the support arm being coupled at a fixed rotational axis to the frame.

13. A continuous transmission device as defined in claim 1, wherein the variable displacement of the support arm occurs along a linear path.

14. A continuous transmission device as defined in claim 10, wherein the linear path is defined by a track guide attached in fixed relationship with the frame, said support arm including a tracking member resident within the track guide for providing linear movement therein.

15. A continuous transmission device as defined in claim 1, further comprising a seat configured for individual use coupled to top portion of the frame at a location which is substantially directly above the point of coupling of the crank lever arm to the frame.

16. A continuous transmission device as defined in claim 1, further comprising pedals attached at ends of the crank lever arm and configured for operation by an individual's feet.

17. A continuous transmission device as defined in claim 1, wherein the guide track comprises a linear slot disposed along a length of the crank lever arm and said tracking means comprises a roller bearing configured to displace within the slot in response to changes of force applied to the crank lever arm.

18. A continuous transmission device as defined in claim 1, wherein the force transfer means comprises a one-way, roller type clutch bearing coupled between the crank lever arm and the drive wheel.

19. A continuous transmission device as defined in claim 1, wherein the connector means comprises a connector lever arm coupled at one end to the tracking means within the guide track and at the other end to the force transfer means.

20. A continuous transmission device as defined in claim 1, wherein the biasing means comprises an air spring, including means for selectively adjusting air pressure to thereby enable adjustment of continuous forces applied at the support arm.

21. A continuous transmission device as defined in claim 1, wherein the support arm comprises a yoke having a forked end with terminal ends and mounting means thereon for attachment of the drive wheel between the terminal ends.

22. A continuous transmission device as defined in claim 1, wherein the device includes two crank lever arms which are coupled together by means of a retraction system which pulls one lever arm to a raised position as the other lever arm is pushed to a lowered position in reciprocating manner.

23. A continuous transmission device as defined in claim 1, further comprising an overdrive shifting mechanism which includes overdrive displacement means coupled to the support arm and attached drive wheel for displacing the support arm from a first neutral position representing normal transmission ratios at high gear to a second, forward position representing an overdrive, higher gear transmission.

24. A continuous transmission device as defined in claim 23, wherein displacement of the overdrive displacement means to an overdrive position causes the tracking means to displace along the guide track away from the central axis of the drive wheel, thereby shortening the length of the crank lever arm and connector means and increasing the amount of rotation experienced by the drive wheel with each pedal movement.

* * * * *